United States Patent [19]

Saegusa

[11] Patent Number: 4,744,101

[45] Date of Patent: May 10, 1988

[54] CORDLESS TELEPHONE SYSTEM

[75] Inventor: Noboru Saegusa, Tokyo, Japan

[73] Assignee: NEC Corporation, Japan

[21] Appl. No.: 51,486

[22] Filed: May 18, 1987

[30] Foreign Application Priority Data

May 31, 1986 [JP] Japan ................................ 61-124702

[51] Int. Cl.⁴ ................................................ H04Q 7/04

[52] U.S. Cl. ........................................ 379/61; 379/58; 379/63

[58] Field of Search ........................ 379/61, 62, 59, 60, 379/63, 58, 56; 455/33, 54

[56] References Cited

U.S. PATENT DOCUMENTS

| | | | |
|---|---|---|---|
| 3,913,017 | 10/1975 | Imaseki | 379/59 |
| 4,400,585 | 8/1983 | Kaman et al. | 455/54 |
| 4,427,980 | 1/1984 | Fennell et al. | 340/825.52 |
| 4,434,506 | 2/1984 | Fujiuara et al. | 455/53 |
| 4,471,352 | 9/1984 | Soulliard et al. | 340/825.44 |
| 4,534,061 | 8/1985 | Ulug | 455/17 |
| 4,628,152 | 10/1986 | Åkerberg | 379/61 |
| 4,633,509 | 12/1986 | Scheinert | 455/33 |
| 4,672,657 | 6/1987 | Dershowitz | 379/63 |

*Primary Examiner*—Robert Lev
*Attorney, Agent, or Firm*—Laff, Whitesel, Conte & Saret

[57] ABSTRACT

A cordless telephone system constituted by a switching station connected to a cable telephone exchanger and at least one telephone set connected to the switching station via a plurality of radio channels. The switching station has a controller which scans the radio channels and selects a nonused radio channel in response to a calling signal from the telephone exchanger, a signal generator for calling a telephone set, a signal detector for detecting a response signal from the telephone set, and a transmitter. The controller changes the number of radio channels to be scanned in accordance with the frequency of use of the radio channels and the transmitter sends a signal representing a changed number of radio channels. Each telephone set has a controller for scanning the radio channels, a signal detector for detecting the calling signal and the signal representing the number of channels from the switching station, and a transmitter for sending a response signal to the switching station.

2 Claims, 4 Drawing Sheets

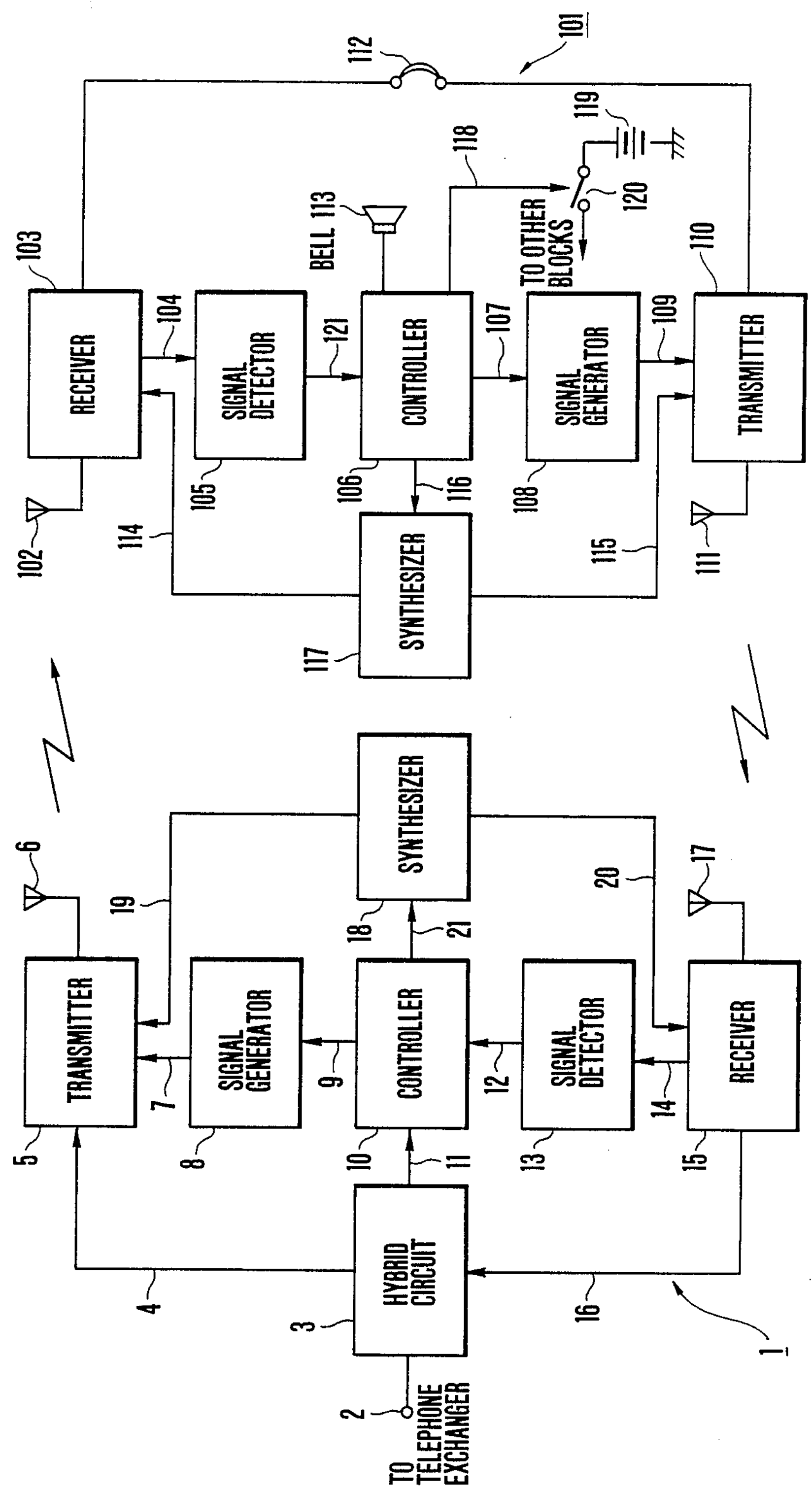
F I G. 1

CORDLESS TELEPHONE SYSTEM

BACKGROUND OF THE INVENTION

The present invention relates to a cordless telephone system and, more particularly, to a multi-channel cordless telephone system which uses a plurality of radio frequencies.

A cordless telephone system is constituted by a switching station connected to a cable telephone exchanger, and a plurality of telephone sets which are electrically connected to the switching station through radiowaves and can be freely carried in a predetermined range. A multi-channel cordless telephone system is arranged so that the switching station and the telephone sets can be connected via a plurality of radio chanhels. In a conventional multi-channel cordless telephone system, the switching station and each telephone set sequentially scan a plurality of radio channels during a standby interval. Upon calling a given telephone set, the switching station detects a nonused radio channel, and sends a calling signal over the detected nonused radio channel. A receiving telephone set always checks the presence/absence of the calling signal from the switching station by scanning the radio channels. When the receiving telephone set detects a calling signal, it stops scanning of the radio channels and sends a response signal, thereby establishing a communication link.

In the conventional connection technique, since the communication links corresponding in number to the radio channels can be established, the frequency of use of each radio channel can be averaged. However, if the number of the radio channels is increased, a time required for scanning is prolonged, and hence a time required to establish the communication link is prolonged.

Since each telephone set must scan all the channels, it cannot perform intermittent reception, and a battery life is shortened.

SUMMARY OF THE INVENTION

It is an object of the present invention to provide a cordless telephone system which is free from the conventional drawbacks and can shorten a time required for connection, and in which each telephone set can perform intermittent reception.

According to the present invention, there is provided a cordless telephone system constituted by a switching station connected to a cable telephone exchanger and at least one telephone set connected to the switching station via a plurality of radio channels, the switching station comprising means for scanning the radio channels, means, responsive to a calling signal from the cable telephone exchanger, for selecting a nonused radio channel, a signal generating means for calling a telephone set, means for detecting a response signal from the telephone set, means for changing the number of radio channels to be scanned in accordance with a frequency of use of the radio channels, and means for sending a signal representing a changed number of radio channels; and each telephone set comprising means for scanning the radio channels, means for detecting the calling signal and the signal representing the number of channels from the switching station, and means for sending a response signal to the switching station.

The number of radio channels to be scanned can be changed in accordance with the frequency of use of the radio channels, thereby, shortening the connection time.

BRIEF DESCRIPTION OF THE DRAWINGS

FIG. 1 is a block diagram showing a cordless telephone system according to an embodiment of the present invention;

DETAILED DESCRIPTION OF THE PREFERRED EMBODIMENTS

Figure 2:
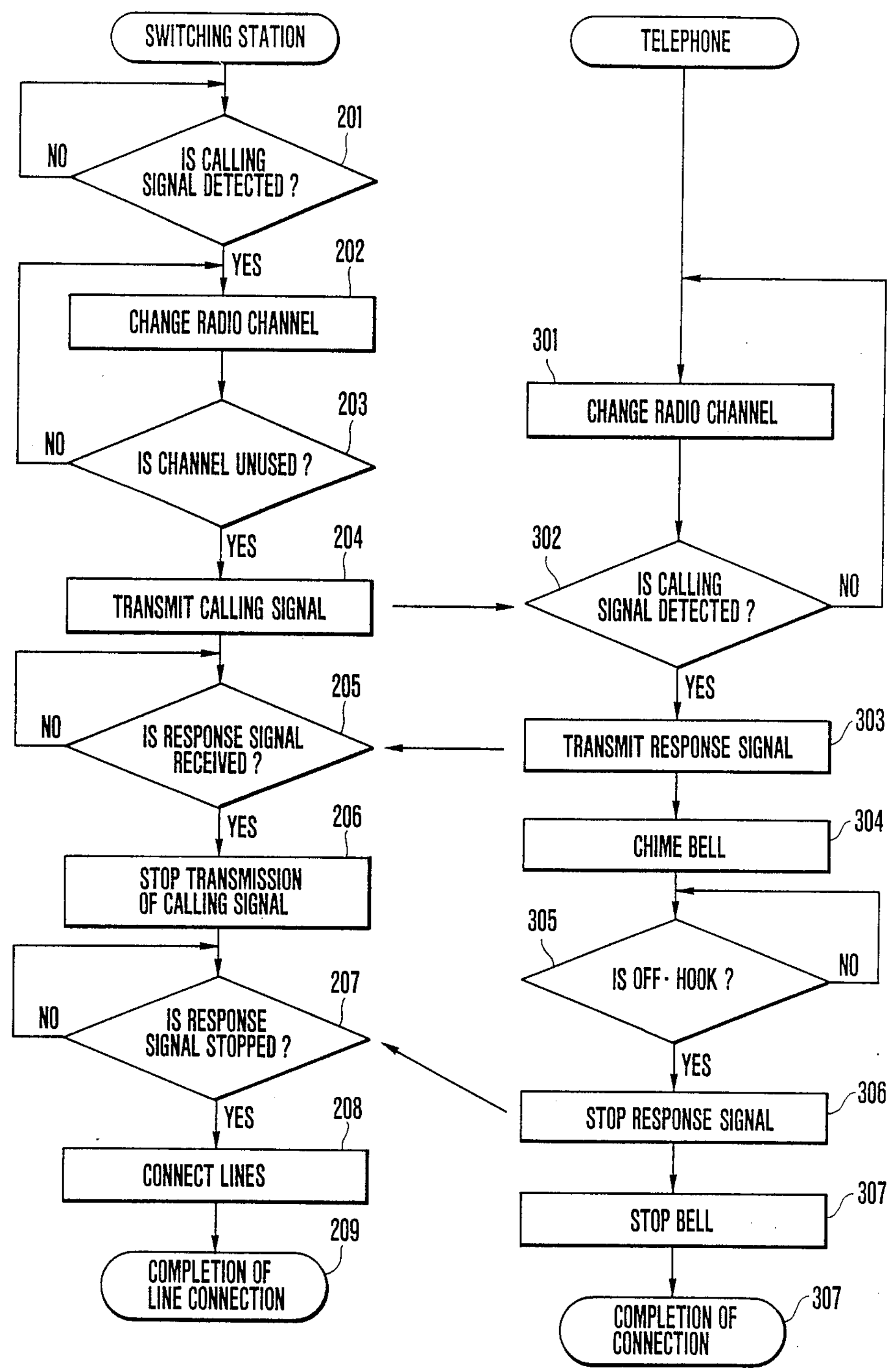
FIG. 2 is a flow chart of an incoming call reception mode of the system shown in FIG. 1.

An embodiment of the present invention will now be described with reference to the accompanying drawings.

FIG. 1 is a block diagram showing an embodiment of the present invention. Referring to FIG. 1, a switching station 1 includes an input terminal 2 for receiving a signal from a cable telephone exchanger, a hybrid circuit 3 connected to the input terminal 2, a transmitter 5, a receiver 15, a controller 10, a transmission antenna 6 connected to the transmitter 5, a signal generator 8 connected to the controller 10 and the transmitter 5, a synthesizer 18 connected to the controller 10, the transmitter 5, and the receiver 15, a signal detector 13 connected to the controller 10 and the receiver 15, and a reception antenna 17 connected to the receiver 15. A telephone set 101 comprises a reception antenna 102 for receiving radiowaves transmitted from the transmission antenna 6 of the switching station 1, a receiver 103 connected to the reception antenna 102, a transmission antenna 111 for transmitting radiowaves to the reception antenna 17 of the switching station 1, a transmitter 110 connected to the transmission antenna 111, a handset 112 connected to the receiver 103 and the transmitter 110, a signal detector 105 connected between the receiver 103 and a controller 106, a signal detector 108 connected between the transmitter 110 and the controller 106, a synthesizer 117 connected to the controller 106, the receiver 103, and the transmitter 110, a bell 113 connected to the controller 106, a battery 119, and a switch 120 for switching the battery 119 to the controller 106 and other circuit blocks.

The connection operation of the system shown in FIG. 1 will be described hereinafter with reference to the flow chart shown in FIG. 2.

A calling signal from the cable telephone exchanger is input from the input terminal 2, and is input to and detected by the controller 10 through the hybrid circuit 3 (step 201). The controller 10 sends a channel designation signal 21 to the synthesizer 18 to sequentially switch the radio channels (step 202), thereby selecting a nonused channel (step 203). Then, the signal generator 8 is turned on to cause it to send a calling signal for the telephone set 101 to the transmitter 5. The transmitter 5 sends radiowaves modulated by the calling signal to the telephone set 101 through the transmission antenna 6 (step 204).

The controller 106 of the telephone set 101 sends a channel designation signal 116 to the synthesizer 117, thereby sequentially switching the radio channels of the receiver 103 (step 301). If the switched channel coincides with the radio channel of the switching station 1, the signal received by the receiption antenna 102 is demodulated by the receiver 103 and is input to the signal detector 105, and the calling signal from the switching station 1 is thereby detected (step 302). In response to this, the controller 106 stops generation of the channel designation signal 116, and turns on the bell 113 (step 304) to signal to a user. Then, the signal generator 108 is turned on to cause it to send a response signal to the transmitter 110. The transmitter 110 transmits radiowaves modulated by the response signal to the switching station 1 through the transmission antenna 111 (step 303). The response signal is received by the reception antenna 17 of the switching station 1, and is demodulated by the receiver 15. The demodulated signal is input to the signal detector 13 to detect the response signal therefrom (step 205). In response to a detection output 12 from the signal detector 13, the controller 10 turns off the signal generator 8 (step 206). The controller 106 of the telephone set 101 turns off the signal generator 108 and the bell 113 (steps 306 and 307) when the user takes the handset 112, that is, goes off-hook (step 305) to answer the phone.

When the response signal is stopped, the controller 10 of the switching station 1 controls the hybrid circuit 3 to signal the response to the cable telephone exchanger (step 208) and to connect a voice signal from the cable telephone exchanger to the transmitter 5 and a voice signal from the receiver 15 to the cable telephone exchanger. Thus, the user can communicate with a calling party.

The number of radio channels is determined in accordance with the volume of traffic during busy hours in an urban area in which cordless telephone systems are concentrated. Therefore, the number of radio channels must be increased. However, if the number of radio channels is increased, the number of channels to be scanned is increased, and a connection time is prolonged. In order to eliminate such a drawback, according to the present invention, a function for checking the frequency of use of the radio channels is additionally provided to the channel scan operation of the conventional switching station.

Figure 3:
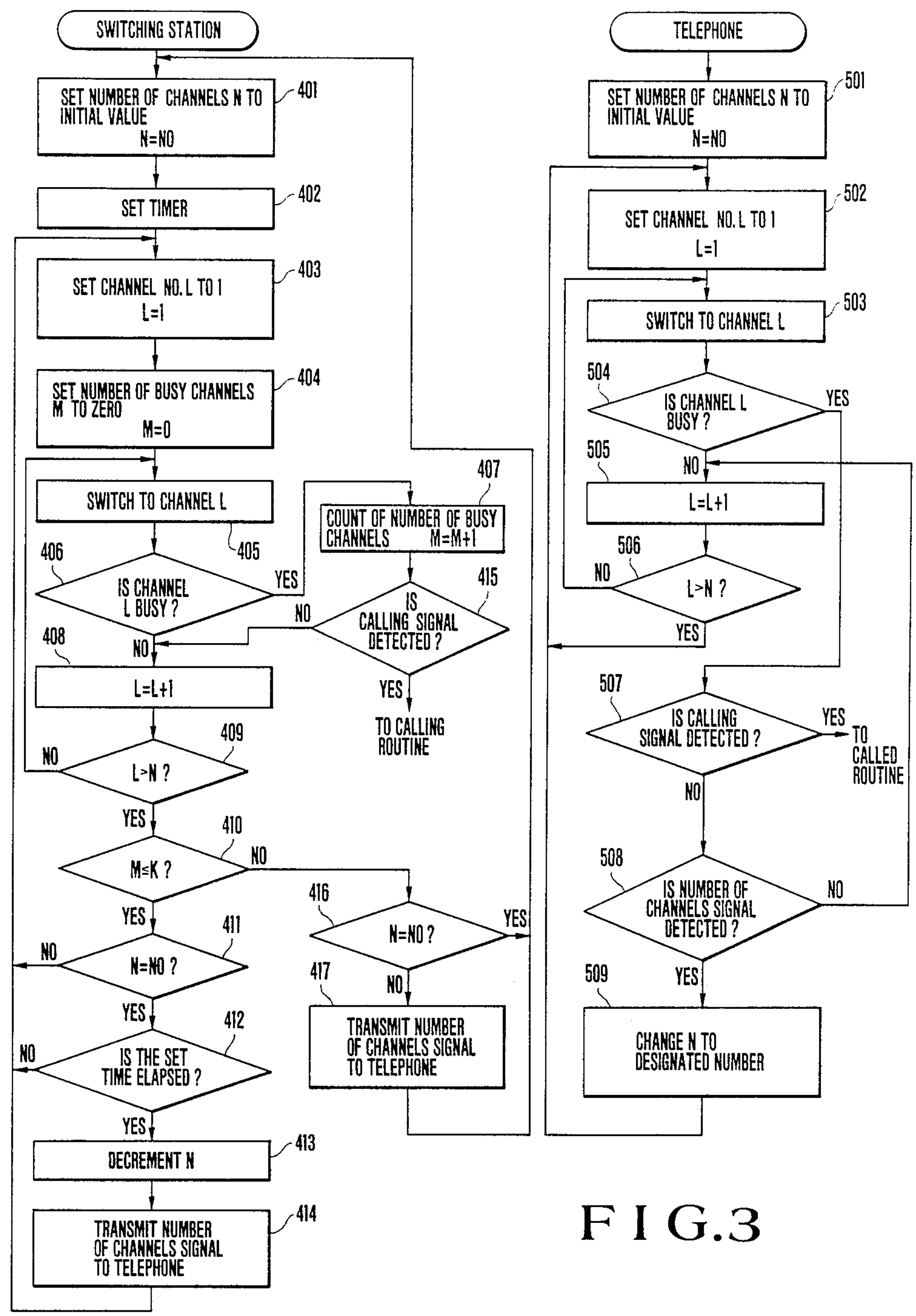
FIG. 3 is a flow, chart of a channel scan mode of the system shown in FIG. 1.

FIG. 3 is a flow chart showing the channel scan operation. Upon power-on, the controller 10 of the switching station 1 sets the number of channels N to be an initial value $N_O$ (step 401), and sets a timer (step 402). The controller 10 sequentially switches the channels 1 to N (steps 403, 405, 408, and 409) to count the number of busy channels M. If the number of busy channels M is smaller than K for a predetermined period of time (steps 410–412), the controller 10 decreases the number of channels N (step 413) and sends a channel number signal to the telephone set 101 (step 414). However, if the number of busy channels M is larger than K for the predetermined period of time (steps 410, 416), the controller 10 increases the number of channels N up to the initial value $N_O$ (step 401), and sends the channel number signal to the telephone set 101 (step 417). In response to this, the telephone set 101 sets the number of channels N to be the initial value $N_O$ after power-on (step 501), and sequentially switches the channels 1 to N (steps 502, 503, 505, and 506). If a channel is busy (step 504), the reception signal is checked. If the calling signal is detected, the flow advances to the incoming call reception step (step 507). If the channel number signal is detected (step 508), the number of channels N is changed to be the designated value (step 509).

In this manner, the switching station checks the frequency of use of the radiowaves, and if the frequency of use is low for a predetermined period of time, the number of radio channels is decreased, thereby shortening a time required for connecting the radio lines.

Figure 4A:
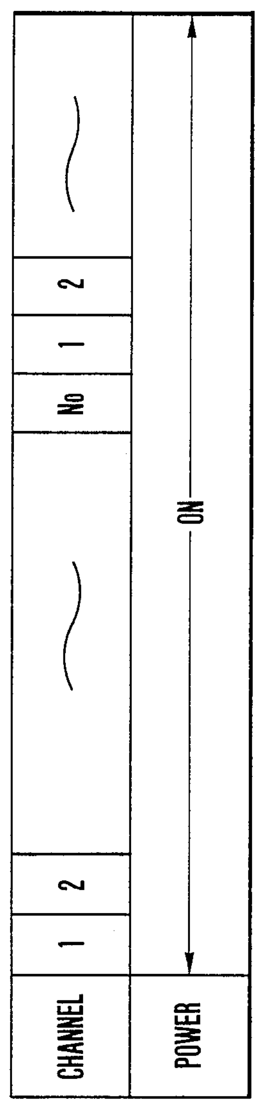
FIGS. 4A and 4B are timing charts of a telephone channel scan mode according to another embodiment of the present invention.
Figure 4B:
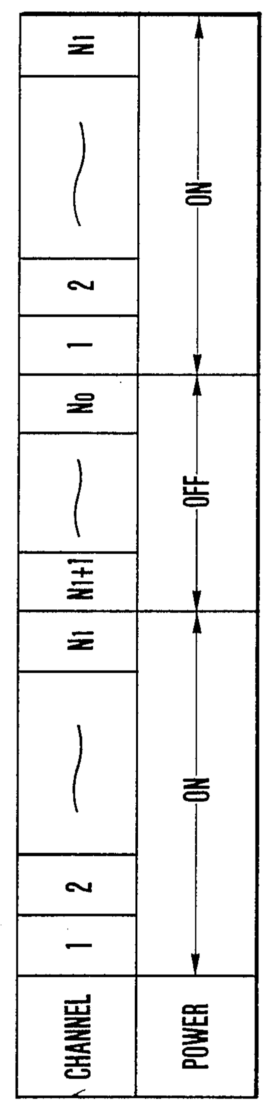

FIGS. 4A and 4B are timing charts showing another embodiment of the present invention. FIG. 4A shows a case wherein the number of communication channels is left to be an initial value $N_O$. In this case, the channel scan operation is performed in the order of channels 1, 2, 3, . . . , $N_O$, 1, 2, . . . , and during this interval, the power source is kept on. FIG. 4B shows a shortened mode wherein the number of channels is reduced to $N_1$. In this mode, channels 1 to $N_1$ are scanned, and during the scan operation of the channels $(N_1+1)$ to $N_O$, the controller 106 controls to turn off the switch 120. In the telephone set 101, since the power source is turned off during a channel scan interval shortened in the shortened mode, a battery life can be prolonged.

According to the present invention as described above, the frequency of use of radiowaves is checked by the switching station. If the frequency of use is low during a predetermined period of time, the number of radio channels is decreased, thereby shortening the time for establishing the radio-communication link. Since the power source for the telephone set can be turned off during a shortened channel scan interval upon a decrease in the number of channels, the battery life can be prolonged if the communication line connection time is left unchanged.

What is claimed is:

1. A cordless telephone system constituted by a switching station connected to a telephone exchanger and at least one telephone set connected to said switching station via a plurality of radio channels;

said switching station comprising means for scanning the radio channels, means, responsive to a calling signal from said telephone exchanger, for selecting a nonused radio channel, signal generating means for calling a telephone set, means for detecting a response signal from said telephone set, means for changing the number of radio channels to be scanned in accordance with a frequency of use of the radio channels, and means for sending a signal representing a changed number of radio channels; and each telephone set comprising means for scanning the radio channels, means for detecting the calling signal and the signal representing the number of channels from said switching station, and means for sending a response signal to said switching station.

2. A system according to claim 1, wherein said telephone set further comprises means for periodically turning off a power source of a receiver in accordance with the signal representing the number of radio channels.

* * * * *